United States Patent
Döfnäs et al.

(10) Patent No.: US 8,400,796 B2
(45) Date of Patent: Mar. 19, 2013

(54) POWER CONVERTER WITH DISTRIBUTED CELL CONTROL

(75) Inventors: Lars Döfnäs, Ludvika (SE); Lennart Harnefors, Eskilstuna (SE); Anders J. Pettersson, Ludvika (SE); Roland Siljeström, Grängesberg (SE); Erika Siljestrom, legal representative, Grängesberg (SE); Gunnar Asplund, Solna (SE)

(73) Assignee: ABB Technology AG, Zurich (CH)

( * ) Notice: Subject to any disclaimer, the term of this patent is extended or adjusted under 35 U.S.C. 154(b) by 321 days.

(21) Appl. No.: 12/811,930

(22) PCT Filed: Dec. 23, 2008

(86) PCT No.: PCT/EP2008/068222
§ 371 (c)(1),
(2), (4) Date: Oct. 29, 2010

(87) PCT Pub. No.: WO2009/087063
PCT Pub. Date: Jul. 16, 2009

(65) Prior Publication Data
US 2011/0222323 A1 Sep. 15, 2011

(30) Foreign Application Priority Data
Jan. 8, 2008 (WO) .................. PCT/EP2008/050120

(51) Int. Cl.
H02M 7/00 (2006.01)
H02M 1/14 (2006.01)

(52) U.S. Cl. ........................................... 363/71; 363/39

(58) Field of Classification Search .................... 363/39, 363/65, 67, 71, 125, 131
See application file for complete search history.

(56) References Cited

U.S. PATENT DOCUMENTS
5,003,455 A * 3/1991 Miller .............................. 363/87
(Continued)

FOREIGN PATENT DOCUMENTS
DE 101 03 031 A1 7/2002
WO WO 2008/067784 A1 6/2008

OTHER PUBLICATIONS

Akagi et al., "Control and Performance of a Transformerless Cascade PWM STATCOM with Star Configuration", IEEE Transactions on Industry Applications, vol. 43, No. 4, Jul./Aug. 2007, XP01118777, pp. 1041-1049.

Hagiwara et al.,"PWM Control and Experiment of Mosular Multi-level Converters", Power Electronics Specialist Conference, Jun. 15, 2008, pp. 154-161, XP-031299968.

(Continued)

*Primary Examiner* — Adolf Berhane
(74) *Attorney, Agent, or Firm* — Birch, Stewart, Kolasch & Birch, LLP (57) ABSTRACT

A device for converting a DC voltage into an AC voltage and vice versa comprises a control system to control the voltage conversion and at least one phase leg (1) with a first (Uvp1) voltage source connected in series between a first DC terminal (4) and a first AC terminal (6) and with a second (Uvn1) voltage source connected in series between the first AC terminal (6) and a second DC terminal (5). Each of the voltage sources comprises at least a first and a second submodule (15) in series-connection, where each submodule (15) comprises at least two power electronic switches (16) connected in parallel with at least one capacitor (17). The control system comprises a central control unit (19) and at least two subunits (20), where the central control unit (19) transmits to each subunit (20) a reference AC voltage (ua_ref) and a switching carrier signal (s_sw) and where each subunit (20) controls the switching of the power electronic switches (16) of one of the submodules (15) according to a PWM pattern so that each time the switching carrier signal (s_sw) crosses the reference AC voltage (ua_ref) either the voltage across the capacitor (17) or a zero voltage are applied to output terminals (26, 27) of the corresponding submodule (15).

14 Claims, 4 Drawing Sheets

U.S. PATENT DOCUMENTS

| | | | | |
|---|---|---|---|---|
| 7,485,987 | B2* | 2/2009 | Mori et al. | 307/63 |
| 7,577,007 | B2* | 8/2009 | Mori et al. | 363/71 |
| 8,050,067 | B2* | 11/2011 | Fulcher et al. | 363/72 |
| 2007/0194627 | A1* | 8/2007 | Mori et al. | 307/103 |
| 2008/0285314 | A1* | 11/2008 | Kojori | 363/37 |

OTHER PUBLICATIONS

Marquardt et al. "New Concept for High Voltage-Modular Multilevel Converter", Power Electronics Specialists Conference, Jan. 1, 2004, XP-002447362.

* cited by examiner

POWER CONVERTER WITH DISTRIBUTED CELL CONTROL

Hirofumi Akagi et al: "Control and Performance of a Transfoimerless Cascade PWM STATCOM With Star Configuration", IEEE Trans. on Industry Applications, Vol. 43, No. 4, July/August 2007, describes a STATic synchronous COMpensator (STATCOM) using a three-phase multilevel converter with cascaded single-phase H-bridges in each phase. The control system of the STATCOM consists of a fully digital control circuit based on a single DSP and three FPGAs. Three carrier signals are phase-shifted by $2\pi/3$ from each other in order to apply a phase-shifted PWM to the H-bridges of each phase. The DSP sends regularly a pair of voltage references to one of the three FPGAs.

The invention is related to a power converter with multi-level voltage output, namely a device for converting a DC voltage into an AC voltage and vice versa comprising a control system to control the voltage conversion and comprising at least one phase leg with a first voltage source connected in series between a first DC terminal and a first AC terminal and with a second voltage source connected in series between the first AC terminal and a second DC terminal, where each of the voltage sources comprises at least a first and a second submodule in series-connection, each submodule comprising at least two power electronic switches connected in parallel with at least one capacitor.

In the art, multi-level converters are known to be used in order to reduce harmonic distortion in the output of voltage source converters. A multilevel converter is a converter where the output voltage—or, in case of a multiphase converter, the voltages—can assume several discrete levels.

Figure 1:
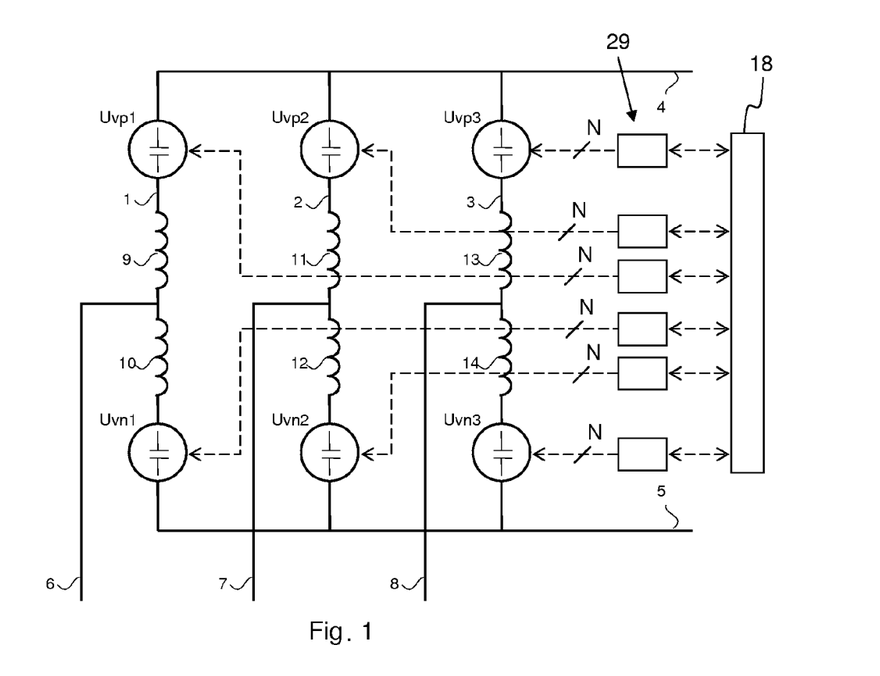
FIG. 1 shows a converter topology as is known from the art.

In the art, different systems and methods to control the voltage conversion of a multi-level power converter are known. DE 10103031, WO 2008/067784 and Marquardt et al: "New Concept for High Voltage-Modular Multilevel Converter", Power Electronics Specialists Conference (PESC), 2004, Aachen, Germany, all disclose a control system for a multi-level converter, the basic topology of which is shown in FIG. 1. The converter is a three-phase converter, having three phase legs 1, 2 and 3. Each phase leg comprises two so-called arms in series-connection: a positive, upper arm which is connected to a first DC terminal 4 at a positive voltage level, and a negative, lower arm, which is connected to a second DC terminal 5 at zero or a negative voltage level. Each positive arm comprises a series-connection of an upper voltage source Uvpi and a first inductor 9, 11 or 13, respectively, and each negative arm comprises a second inductor 10, 12 or 14, respectively, and a lower voltage source Uvni, where i stands for the number of the corresponding phase leg. The midpoint or connection point between the first and second inductors of each phase leg is each connected to an AC terminal 6, 7 or 8, respectively. All the phase legs are connected in parallel to each other and to the two DC terminals 4 and 5. By appropriately controlling the voltage sources Uvpi and Uvni of the phase legs over time, the AC to DC conversion is made. In general, such a converter can have any number P of phase legs depending on the number of phases the AC voltage has. An example for a single phase multi-level converter can be seen in M. Glinka and R. Marquardt, "A new ac/ac multilevel converter family," IEEE Transactions on Industrial Electronics, vol. 52, no. 3, June 2005, pp. 662-669.

Figure 2:
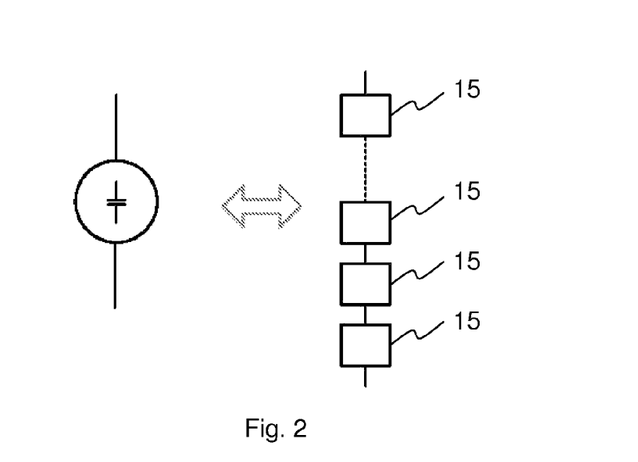
FIG. 2 shows the setup of the voltage sources in the phase legs of the converter of FIG. 1 as known from the art.

The general setup of the voltage sources Uvpi and Uvni, respectively, of each arm, as known from the above named art, is depicted in FIG. 2. Each voltage source is made up of a series connected string of submodules 15, where at least two submodules 15 are comprised in one such string. The total number of series connected submodules 15 per arm will be given with N in the following, where N is greater than 1, but may be as high as several hundred.

Figure 3:
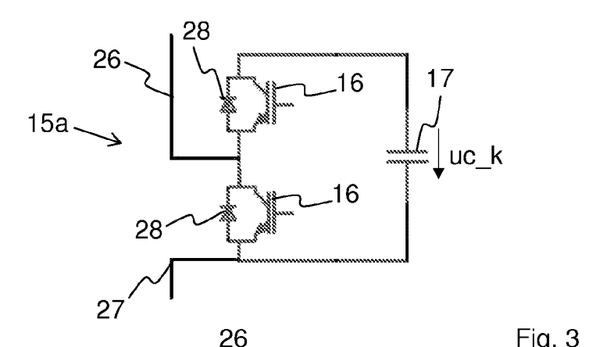
FIG. 3 shows two different embodiments of the submodules in the converter of FIGS. 1 and 2.

From FIG. 3, two different embodiments 15*a* and 15*b* of the submodules 15 can be seen, which are known from DE 10103031. Any combination of the submodules is possible within each voltage source. The submodules have the form of commutation cells, each cell comprising two series-connected semiconductor valves and a large DC capacitor 17 holding a direct voltage for energy storage reasons. The two valves are equipped each with a free-wheeling diode 28 in anti-parallel connection to a power electronic switch 16 with controllable turn-on and turn-off capability, the latter for example being a transistor, a gate-turn-off (GTO) thyristor, or a series and/or parallel connection thereof. Depending on which of the two power electronic switches 16 is conducting, the corresponding submodule 15 can assume one of two switching states, where in state one zero voltage or in state two the instantaneous voltage uc_k across the capacitor is applied to the output terminals 26 and 27. The letter k stands for the number of the submodule 15 within the corresponding arm of the phase leg, where $1 \leq k \leq N$. As a result, the function of the two valves per submodule 15 is to switch the capacitor 17 in and out of the electrical circuit of the corresponding arm in a manner that gives the desired conversion between AC and DC voltage, and also such that the mean value of the voltage uc_k across the capacitor 17 can be influenced.

Regarding the control of the known multi-level converters, Glinka et. al. propose to control the switching of the power electronic switches in a centralized fashion for all submodules in a certain arm. When the control system determines that a switching event should be performed, the submodule to be switched is selected as that one whose capacitor voltage deviates the most from a reference voltage, provided that the direction of current is such that the deviation can be reduced. Thereby, all capacitor voltages of the submodules are prevented from diverging from the reference voltage.

WO 2008/067784 A1 discloses a control system for the multi-level converter according to FIG. 1, comprising a central control unit 18 and arm control units 29, where the number of the arm control units 29 is equal to the total number of arms of the converter, i.e., 2·P=6. The central control unit 18 controls the output current of the converter by determining reference values for each arm control unit 29 depending on different measurements, such as converter current and voltage. In response to the arm reference values, the arm control units 29 perform individual control functions for the switching of each of the submodules 15 in the corresponding arm.

It is an object of the invention to propose a power converter of the kind described above with a simplified control system.

This object is achieved by a device according to claim 1.

The control system of the device for converting a DC voltage into an AC voltage and vice versa as described above, comprises according to the invention a central control unit and at least two subunits, where the central control unit transmits to each subunit a reference AC voltage and a switching carrier signal and where each subunit controls the switching of the power electronic switches of one submodule according to a PWM pattern so that each time the switching carrier signal crosses the reference AC voltage either the voltage across the capacitor or a zero voltage are applied to output terminals of the corresponding submodule.

The invention is based on the recognition of the fact that the known control system with a central control unit and arm control units has the disadvantage that each arm control unit needs to control the switching of all its corresponding submodules, which has to be done individually, i.e. each submodule requires its own input or reference values to be generated by the arm control unit. Accordingly, for each submodule, invidual control functions need to be established and executed in the arm control unit, and when installing the control system, care needs to be taken to connect each submodule to the associated interface on the arm control unit.

In contrast to that, it is possible to modularize the control system based on a control method as described in the patent application PCT/EP2008/050120, the priority of which is claimed here. The basic principle of this control method is to perform switching of the submodules according to a pulse-width modulation (PWM) in a distributed manner rather than in a centralized manner, where one of two PWM related signals, a reference AC voltage or a switching carrier signal, is distributed over time.

The reference AC voltage is a reference value for each voltage source and thereby for each arm. The switching carrier signal is identical in shape for all submodules of each arm. The central control unit generates the reference AC voltage for each arm as well as the switching carrier signal and transmits them to sub-control units or subunits, where each subunit is associated to one of the submodules of the arms. The subunits compare the switching carrier signal and the AC reference voltage and initiate a switching, and thereby a change in the state of the corresponding submodule from state one to state two or vice versa, each time the switching carrier signal crosses the reference AC voltage.

The necessary distribution of one of the two PWM related signals can be performed either in the central control unit or in each subunit. Apart from a possible generation of an individual time delay, all control and switching generation functions to be performed by the subunits are identical to each other since each subunit communicates with only one submodule which is identical to all other submodules. Accordingly, a true modularization of not only the power electronics harware but also of the control system is established, which facilitates the development of the control functions and simplifies the installation, in particular the wiring, as well as servicing and maintanance of the multi-level power converter.

As mentioned above, one of the two PWM related signals needs to be distributed over time. This is done such that the switching events of the valves in the submodules take place in a succeeding sequence for the submodules in each arm. The object of this is to prevent that the valves of two or more cells are switched simultaneously. The necessary time delayed switching carrier signal or reference AC voltage for each of the subunits of one arm can be generated by the central control unit, which would mean that the central control unit would have to send out individual reference signals to each of the subunits, thereby impairing the general advantage of modularization.

Instead, it is preferred that the central control unit sends out the same switching carrier signal and reference AC voltage to all the subunits of one arm, thereby keeping the number of data to be sent out by the central control unit as low as possible. A low data rate has advantages both with regards to communication reliability as costs.

If the same switching carrier signal and reference AC voltage is transmitted by the central control unit to one arm, the necessary delay in time can then be applied to one of the two PWM related signals by each subunit individually before comparing the signals with each other.

In a preferred embodiment, the time delay is predefined for each subunit so that the delayed switching carrier signals or reference AC voltages, respectively, of all subunits are evenly distributed over time with respect to each other. An even time distribution of one of the two signals has shown to result in a smooth AC voltage curve at the AC terminals of the power converter, with a low sensitivity to harmonics and other disturbances coming from an AC voltage network connected to the AC terminals.

For an even time distribution, the time delay is preferrably chosen to be a phase shift of $2\pi/(pM)$ between adjacent subunits, in which p is a pulse number defined as the time period of the reference AC voltage devided by the time period of the switching carrier signal and in which M is the number of submodules per phase leg, $M=2 \cdot N$.

Preferably, a saw tooth signal is used as switching carrier signal.

In a further embodiment of the invention, each subunit adds a correction value to the amplitude of the reference AC voltage before performing the PWM, especially before performing the comparison of the two PWM related signals. The correction value is chosen to be proportional to the difference between the instantaneous voltage of the capacitor $uc\_k$ and a reference capacitor voltage $uc\_ref$. In this way, all capacitor voltages $uc\_k$ of the submodules are prevented from diverging from their corresponding reference value $uc\_ref$. As a result, the mean value of the capacitor voltage is kept substantially at the same predefined level, which leads to a robust and fast control of the power converter and thereby to an even smoother AC voltage curve at the AC terminals.

A further improvement in the quality of the AC voltage cure at the AC terminals can be achieved, when each subunit low-pass filters the difference between the instantaneous voltage $uc\_k$ of the capacitor and the reference capacitor voltage $uc\_ref$ before adding it to the amplitude of the reference AC voltage.

In a special embodiment, the reference capacitor voltage $uc\_ref$ is transmitted by the central control unit to each subunit, where it is preferred for reason of simplicity to send out the same value for all subunits of one arm.

It is further suggested, that each subunit transmits the instantaneous voltage $uc\_k$ of its corresponding capacitor to the central control unit. The central control unit can process all capacitor voltage values and produce an information which represents the overall energy storage state of the power converter. Based on this information, the central control unit can then, among other purposes, generate the appropriate reference capacitor voltage $uc\_ref$ and reference AC voltage for each arm.

In further embodiments, the central control unit and the subunits exchange further signals with each other. In one arrangement, the central control unit transmits an order signal BLK to the subunits, which is a logic signal which determines whether switching of the corresponding submodule or of certain valves in the submodule is allowed or not. Alternatively, the order signal BLK can be a broadcast signal for all subunits simultaneously, i.e. which results in a blocking of all power electronic switches in the converter at once. In this case and in combination with one of the above named embodiments, the central control unit may transmit the same data to all subunits of one arm of the converter, namely the reference AC voltage and the switching carrier signal for that arm as well as an identical reference capacitor voltage $uc\_ref$ and an identical order signal BLK. This results in a minimization of efforts and costs for the implementation and maintenance of the power converter.

In another embodiment, the subunits may transmit status information to the central control unit. One such status information could be, in the case that the power electronic switches each comprise a series connection of semiconductor devices, as transistors or GTO thyristors, a number $nh\_k$ identifying the number of semiconductor devices in the relating power semiconductor switch which are still controllable, i.e. which are healthy. Such a signal could be used by the central control unit to generate information about the remaining voltage conversion capability of the power converter and to adjust the values of the reference capacitor voltage uc_ref and of the reference AC voltage accordingly.

Another suggested status information is a submodule failure indication signal FAIL_k which is a logic signal indicating a failure in the corresponding submodule. This signal FAIL_k can be used in the central control unit for condition monitoring and protection purposes, e.g., for deciding when switching of certain submodules should be prohibited and thereby when the corresponding order signal BLK is to be activated.

Regarding the physical implementation of the control system, different setups are possible. The subunits can for example be hardware integrated with the submodules, but they can as well be placed in a distance to the corresponding submodule and connected to it by an optical fibre cable or another suitable communication connection. The subunits may comprise for the data processing either a digital signal processor (DSP), a field-programmable gate array (FPGA), an application-specific integrated circuit (ASIC), or a combination thereof. The central control unit may communicate with the 2·N·P subunits using electronic circuitry and/or optical fiber cables. Digital signaling is normally used, with serial and/or parallel communication.

Other features and advantages of the present invention will become more apparent to a person skilled in the art from the following detailed description in conjunction with the appended drawings in which.

The FIGS. 1 to 3 were explained above with respect to the structure of a multi-level power converter and its control system known from the art.

Figure 4:
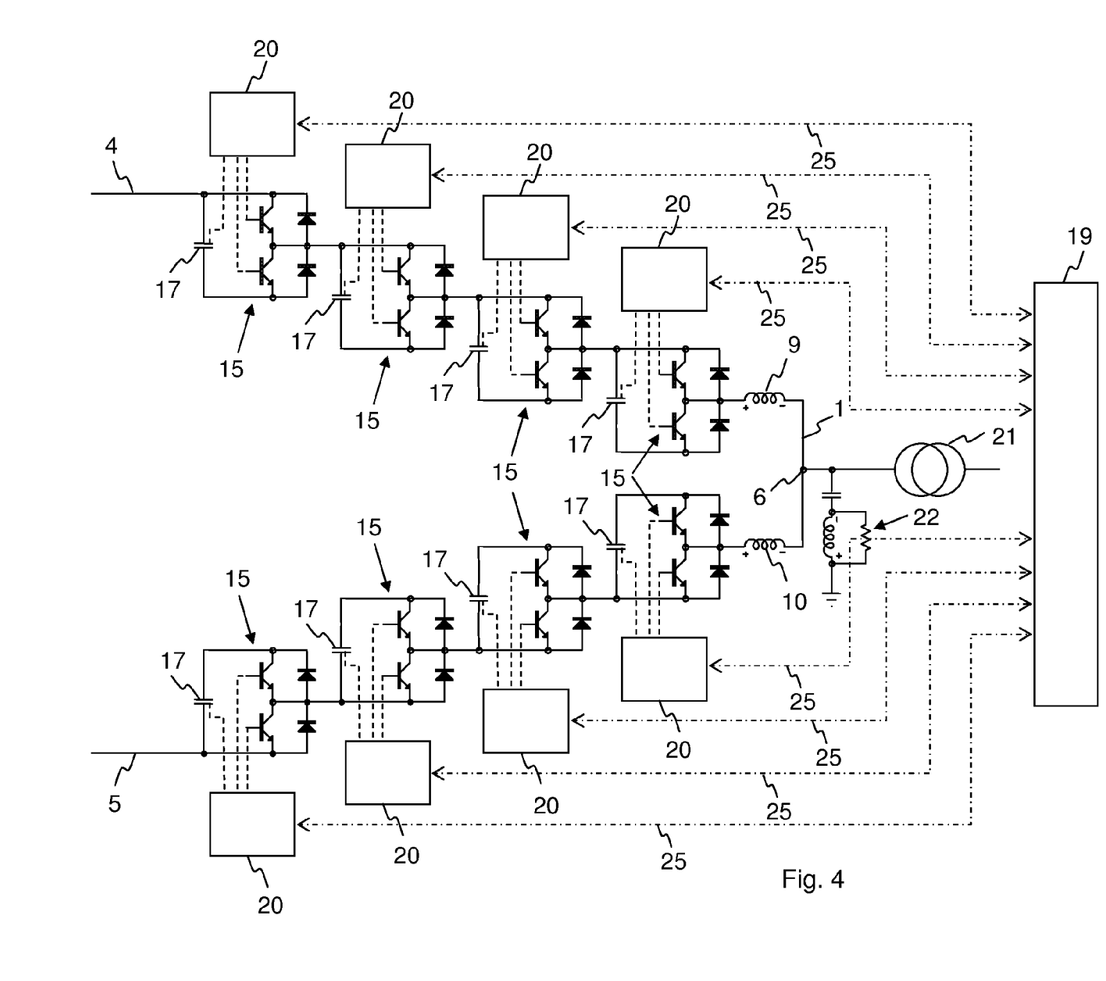
FIG. 4 shows one phase leg of a converter with a distributed control system according to the invention.

The device for converting a DC voltage into an AC voltage and vice versa according to the invention can contain either a single phase leg or multiple phase legs, depending on how many phases the AC voltage has. One phase leg 1 of a converter according to the invention is shown in FIG. 4, where the same reference numbers are applied to the same components as described with respect to FIGS. 1 to 3. In the upper voltage source of the upper arm between the first DC terminal 4 and first inductor 9, four submodules 15 of type 15b (see FIG. 3) are connected in series, and a similar series connection of four submodules 15 of type 15b is arranged as the lower voltage source of the lower arm between the second inductor 10 and the second DC terminal 5. Accordingly, the number N of the shown phase leg 1 is 4 and the number M is 8. The upper and lower voltage source, respectively, are connected via the first and the second inductor, respectively, to the first AC terminal 6. A transformer 21 and filtering equipment 22 are indicated here on the AC side of the phase leg 1, i.e. in direct connection to the first AC terminal 6.

The control system to control the voltage conversion of the converter from AC to DC or vice versa is shown to comprise a central control unit 19 and eight subunits 20, where each of the subunits is associated to and connected with one of the eight submodules 15. In FIG. 4, it is schematically indicated with dashed lines that the subunits 20 interact, in particular, with the power electronic switches 16 and with the capacitor 17 of the corresponding submodule 15. Between the central control unit 19 and the subunits 15, dash-dotted communication lines 25 indicate that data are sent from the central control unit 19 to the subunits 15 and vice versa.

Figure 5:
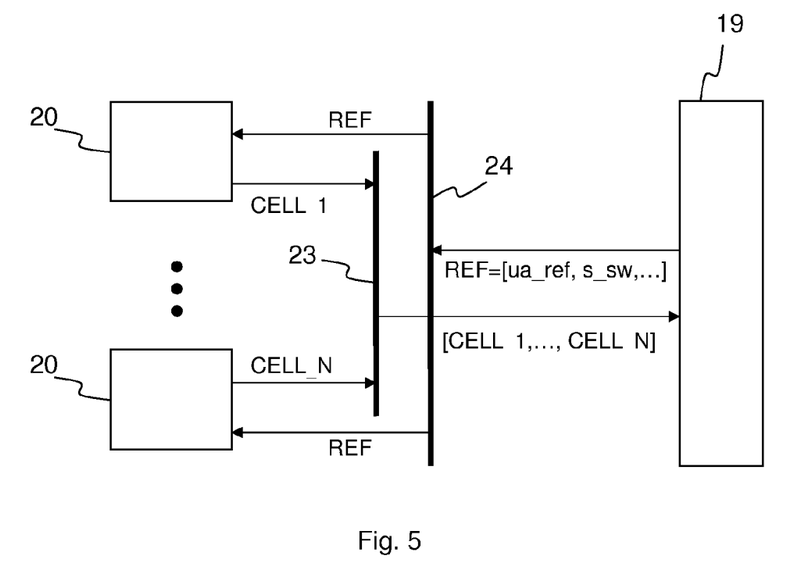
FIG. 5 shows the principle of communication in the distributed control system of FIG. 4.

FIG. 5 illustrates the general principle of communication of the control system belonging to the upper arm of the phase leg 1 shown in FIG. 4. The central control unit 19 transmits reference data REF via a first data bus 24 to the subunits 20 and the subunits 20 return submodule information data CELL_k, with N=4 and $1 \leq k \leq N$, via a second data bus 23 to the central control unit 19. The first and second data busses 23 and 24 can be realized as separate monodirectional busses or as common bidirectional bus, using serial or parallel communication protocols. For their physical implementation, electronic circuitry and/or optical fiber cables can be used.

In a special embodiment of the invention, the reference data REF for the upper arm of phase leg 1 comprise among others a reference AC voltage ua_ref and a switching carrier signal s_sw, which are identical for all four subunits 20 of that arm. The switching carrier signal s_sw of this embodiment is a saw tooth signal. Each subunit 20 applies a time delay to the received switching carrier signal s_sw, where the time delay is a phase shift of $2\pi/pM$ between adjacent subunits 20, in which p is the pulse number defined as the time period of the reference AC voltage ua_ref devided by the time period of the switching carrier signal s_sw and in which M is 8 for this specific example.

In addition to ua_ref and s_sw, the reference data REF further comprises a reference capacitor voltage uc_ref for the capacitor 17 of each submodule 15 and an order signal BLK which indicates whether switching of the corresponding submodule 15 is allowed or not, where in this special embodiment a common reference capacitor voltage uc_ref and a common order signal BLK is transmitted to all subunits 20 of the arm. This means that identical reference data REF are sent out, i.e. only one data packet REF=[ua_ref; s_sw; uc_ref; BLK] needs to be placed on the first data bus 24.

The submodule information data CELL_k each comprise an instantaneous voltage uc_k of the corresponding capacitor 17, which is measured by a sensor and processed by the associated subunit 20. The subunit 20 uses the received reference capacitor voltage uc_ref and the measured and thereby instantaneous voltage uc_k in order to determine a correction value as being proportional to the difference between the instantaneous voltage uc_k of the capacitor 17 and the reference capacitor voltage uc_ref. Each subunit 20 adds the correction value to the amplitude of the reference AC voltage ua_ref. Afterwards, each subunit 20 uses the delayed switching carrier signal and the corrected reference AC voltage to control the switching of the power electronic switches 16 of the corresponding submodule 15 according to a PWM pattern so that each time the delayed switching carrier signal crosses the corrected reference AC voltage either the voltage across the capacitor 17 or a zero voltage are applied to the output terminals 26 and 27 of the submodule 15.

The submodule information data CELL_k further comprises status information, namely the numbers nh1_k and nh2_k, which indicate the number of healthy semiconductor devices in the two power semiconductor switches 16 of the submodule 15, and the submodule failure indication signal FAIL_k. Accordingly, the data packet for each subunit 20 of FIG. 5 has the following form: CELL_k=[uc_k, nh1_k, nh2_k, FAIL_k].

Figure 6:
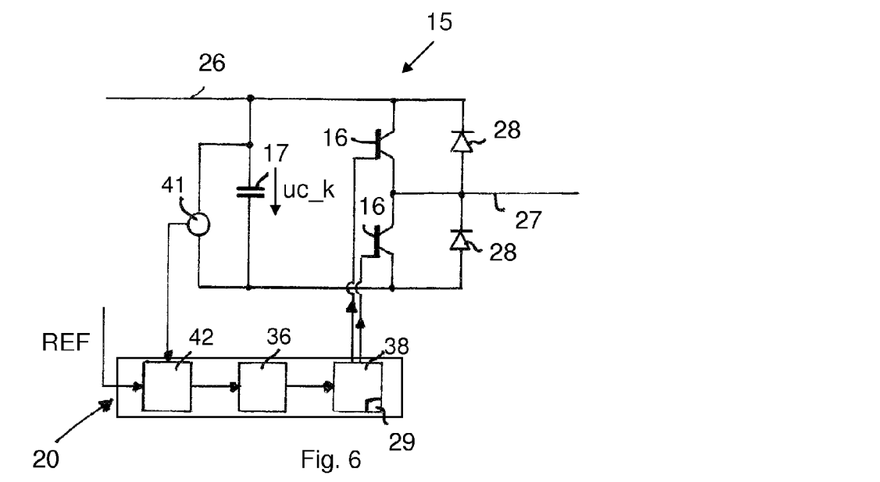
FIG. 6 shows a detailed view of one of the subunits of FIG. 4.
Figure 7:
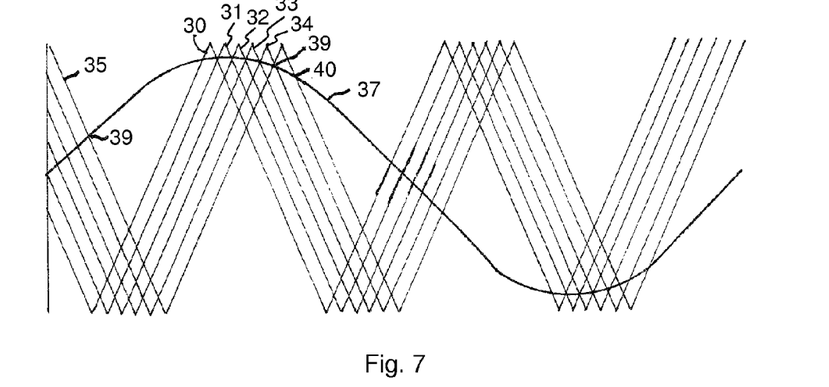
FIG. 7 shows individual switching carrier signals for six of the sixteen power electronic switches of the phase leg of FIG. 4, FIG. 8 schematically illustrates the switching carrier signal of one power electronic switch and the corrected reference AC voltage for this power electronic switch.

The different elements of each of the subunits 20 which perform the above described control functions, are shown in detail in FIG. 6. The subunit 20 comprises first means 29 configured to deliver an individual time delayed saw tooth voltage 35 for the control of the power electronic switches 16 of the submodule 15. The saw tooth voltages for all submodules 15 of phase leg 1 shown in FIG. 4 are identical but evenly distributed over the time with respect to each other with the above described phase shift of $2\pi/pM$ between adjacent submodules 15. When looking at the saw tooth voltages in the order of the submodules 15 starting with the uppermost submodule which is directly connected to the first DC terminal 4 and ending with the lowermost submodule which is directly connected to the second DC terminal 5, the even time distribution becomes visible. For simplifying the illustration, the saw tooth voltages 30 to 35 of the uppermost six of the eight submodules 15 of phase leg 1 are shown in FIG. 7.

The subunit 20 shown in FIG. 6 also comprises second means 36 configured to generate a corrected reference AC voltage 37 for the corresponding submodule 15 with the same frequency and phase as that of the other submodules 15. The reference alternating voltage ua_ref has thereby a frequency which is equal to that of the voltage on the AC voltage side of the converter, such as 50 Hz or 60 Hz. The subunit 20 further comprises control means 38 configured to control the corresponding submodule 15 according to a PWM pattern so that the power electronic switches 16 are switched to change the switching state from state one to state two and conversely each time the time delayed saw tooth voltage 35 crosses the corrected reference AC voltage 37, as is shown in FIG. 7. Accordingly, as an example, the upper power electronic switch 16 of submodule 15 may be turned on and the lower power electronic switch 16 may be turned off at the crossing point 39 for delivering a zero voltage across the terminals 26, 27 until the next crossing point 39, in which the upper power electronic switch 16 is turned off and the lower power electronic switch 16 is turned on for applying the voltage uc_k across the capacitor 17 between the two terminals 26, 27 until the next crossing point 40 and so on.

The subunit 20 receives from a sensor 41 the measured voltage uc_k across the capacitor 17. Third means 42 of the subunit 20 are adapted to compare that voltage uc_k, which is a direct voltage, with a reference capacitor voltage uc_ref received as one of the reference signals REF from the central control unit 19. The second means 36 is configured to calculate an offset or correction value in dependence on the result of the comparison of third means 42 and to add this correction value to the reference AC voltage ua_ref, which is also received from the central control unit 19. This means in practice that the amplitude of the reference AC voltage ua_ref for a single submodule 15 is raised or lowered when the voltage across the capacitor 17 belonging to that submodule deviates from the average voltage of all the submodule capacitors of the phase leg 1.

Figure 8:
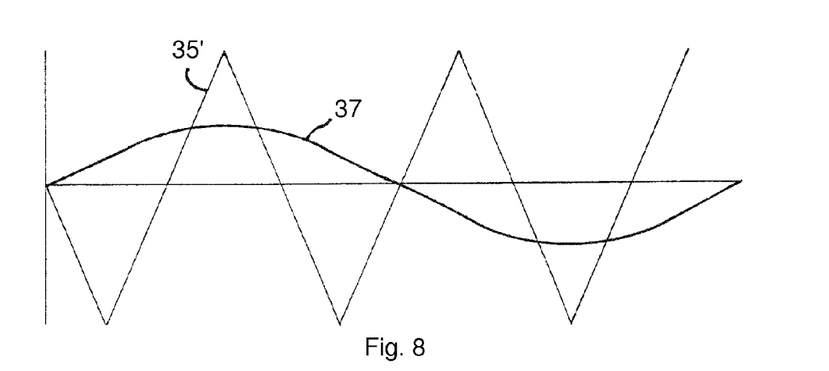

FIG. 8 shows how the amplitude of the reference AC voltage ua_ref has been considerably reduced in subunit 20 of FIG. 6, resulting in the corrected reference AC voltage 37'. In FIG. 8, only the individual saw tooth voltage 35' for the corresponding submodule 15 is shown in addition. Thus, the PWM pattern of the submodule 15 of FIG. 6 is determined by the crossing points of the curves 35' and 37' of FIG. 8, which differ considerably from corresponding crossing points of FIG. 7. It has turned out that this way of individually adjusting the reference AC voltage for each submodule will have a balancing effect on the direct voltages across the capacitors of the submodules, so that if a voltage of a capacitor of a submodule is lowered below an average direct voltage of all capacitors, the adjustment of the amplitude of the reference AC voltage will tend to raise the voltage across this capacitor. Conversely, if the voltage of a capacitor is higher than the average, the voltage will be lowered as a result of the correction of the amplitude of ua_ref.

The invention claimed is:

1. Device for converting a DC voltage into an AC voltage and vice versa comprising a control system to control the voltage conversion and comprising at least one phase leg with a first voltage source connected in series between a first DC terminal and a first AC terminal and with a second voltage source connected in series between the first AC terminal and a second DC terminal, where each of the voltage sources comprises at least a first and a second submodule in series-connection, each submodule comprising at least two power electronic switches connected in parallel with at least one capacitor, characterized in that the control system comprises a central control unit and as many subunits as submodules, where the central control unit transmits to each subunit a reference AC voltage and a switching carrier signal and where each subunit controls the switching of the power electronic switches of one of the submodules according to a PWM pattern so that each time the switching carrier signal crosses the reference AC voltage a change in the state of the corresponding submodule from, a state one to a state two or vice versa is initiated, where in state two the voltage across the capacitor, and in state one a zero voltage is applied to output terminals of the corresponding submodule, wherein the central control unit transmits the same reference AC voltage and the same switching carrier signal to all subunits belonging to the same voltage source.

2. Device according to claim 1, where each subunit applies an individual time delay to the switching carrier signal before performing the PWM control.

3. Device according to claim 1, where each subunit applies an individual time delay to the reference AC voltage before performing the PWM control.

4. Device according to claim 2 where the time delay is predefined for each subunit so that the delayed switching carrier signals or reference AC voltages, respectively, of all subunits are evenly distributed over time with respect to each other.

5. Device according to claim 4, where the time delay is a phase shift of $2\pi/(pM)$ between adjacent subunits, in which p is the pulse number defined as the time period of the reference AC voltage divided by the time period of the switching carrier signal and in which M is the number of submodules per phase leg.

6. Device according to claim 1, where the switching carrier signal is a saw tooth signal.

7. Device according to claim 1, where each subunit adds a correction value to the amplitude of the reference AC voltage before performing the PWM, where the correction value is proportional to the difference between an Instantaneous voltage of the capacitor and a reference capacitor voltage.

8. Device according to claim 7, where each subunit low-pass filters the difference between the instantaneous voltage of the capacitor and the reference capacitor voltage before adding it to the amplitude of the reference AC voltage.

9. Device according to claim 8, where the central control unit transmits the reference capacitor voltage to each subunit.

10. Device according to claim 7, where each subunit transmits the instantaneous voltage of its corresponding capacitor to the central control unit.

11. Device according to claim 1, where the central control unit transmits an order signal to the subunits determining if switching of at least one of the power electronic switches is allowed or not.

12. Device according to claim 1, where the subunits transmit status information to the central control unit.

13. Device according to claim 1, where each of the subunits is connected via an optical fibre cable to the corresponding submodule.

14. Device according to claim 1, where the central control unit and the subunits communicate with each other via a serial or parallel data bus or via a wireless connection.

* * * * *